United States Patent [19]

Samulak

[11] Patent Number: 4,700,888

[45] Date of Patent: Oct. 20, 1987

[54] AUXILIARY HEATER CONTROLLER

[75] Inventor: Douglas J. Samulak, Columbus, Ind.

[73] Assignee: Cummins Engine Company, Inc., Columbus, Ind.

[21] Appl. No.: 875,577

[22] Filed: Jun. 18, 1986

[51] Int. Cl.⁴ ............................................. G05D 23/00
[52] U.S. Cl. .................... 237/2 A; 219/202; 219/205
[58] Field of Search ............ 237/2 A, 12.3 A, 12.3 B, 237/12.3 R; 219/202, 205

[56] References Cited

U.S. PATENT DOCUMENTS 3,122,319  2/1964  Friedl et al. ............... 237/12.3 B X
4,280,330  7/1981  Harris et al. ............... 237/12.3 C X

FOREIGN PATENT DOCUMENTS 221708  12/1983  Japan ............................... 237/12.3 B Primary Examiner—Henry A. Bennet
Attorney, Agent, or Firm—Sixbey, Friedman & Leedom

[57] ABSTRACT

An auxiliary heater controller is provided for use with a liquid cooled engine which includes two fluid circuits. The first fluid circuit includes the engine, a heat exchanger with an air flow creating fan, a heater and a pump, while the second fluid circuit shunts the engine and includes only the heat exchanger, heater and the pump. A single two-way valve operates to direct fluid to either the first or the second fluid circuit, and a timer unit is provided which operates automatically at a preset time to cause fluid to flow in the first fluid circuit for a predetermined time period. The air flow creating fan is operated by a thermostat at low speed when the engine is not operating and is operated by a manually controlled variable speed control unit when the engine is operating.

32 Claims, 3 Drawing Figures

Microfiche Appendix Included
(1 microfiche, 22 pages)

AUXILIARY HEATER CONTROLLER

The present invention incorporates a microfiche appendix with one microfiche having 22 frames.

TECHNICAL FIELD

The present invention relates to an auxiliary heater and heater controller for use with fluid cooled engines, and more particularly to a novel auxiliary heater controller which coordinates an auxiliary heater, the operation of a fan for a fluid to air heat exchanger, a thermostat, and a single electronically controlled bypass valve to selectively provide heated fluid to the engine or to bypass the engine and provide heated fluid only to the fluid to air heat exchanger.

BACKGROUND ART

It is well known to provide auxiliary heater systems for water-cooled engines. Such auxiliary heater systems have proved to be particularly useful with water-cooled gasoline and diesel engines for trucks and other large vehicles, as the auxiliary heater can be used with conventional engine coolant to heat the vehicle as well as the vehicle engine. Thus, in extremely cold conditions, it is not necessary to leave a truck engine idling to warm the cab or to keep the engine warm for quick starting. With diesel engines, systems of this type are most useful, for the engine may prove practically impossible to start without an auxiliary heating source in below zero temperatures.

Many known auxiliary heating units for water-cooled vehicle engines circulate some of the cooling fluid from the engine through an auxiliary heater and a fluid to air heat exchanger for the interior of the vehicle before passing the heated fluid back to the vehicle engine. Systems of this type, although ultimately effective, must supply sufficient heated fluid to heat both the engine and the heat exchanger, as they provide no means for bypassing the engine. Thus, the fluid to be heated by the auxiliary heater and supplied to the heat exchanger is cooled by the engine mass, and is therefore much colder than the fluid discharged directly from the heat exchanger. Systems of this type require either extended operation of the auxiliary heater or a large capacity auxiliary heater is sufficient heat is to be rapidly provided by the heat exchanger to the interior of the vehicle in cold conditions. Extended operation of the auxiliary heater requires an extended operation of an electric blower for the heat exchanger which depletes the reserve of the vehicle battery when the engine is not running. Auxiliary heating systems of this type are illustrated by the Kofink et al., U.S. Pat. No. 4,010,895 and the Stolz U.S. Pat. No. 3,795,234.

To eliminate the cooling effect of an inoperative engine, auxiliary heating systems have been developed which are capable of shunting heated fluid around the engine and directly to a heat exchange system for a vehicle cab. A system of this type is illustrated by the Moran U.S. Pat. No. 3,758,031. Although heating systems which bypass the vehicle engine operate more effectively to rapidly heat the vehicle cab during periods when the vehicle engine is shut down, such systems in the past have required an inordinate number of separate valves to accomplish the bypass operation. In such systems, the multiplicity of separate valves employed are flow control valves which cannot be operated with the vehicle engine running or with the vehicle in motion.

DISCLOSURE OF THE INVENTION

It is a primary object of the present invention to provide a novel and improved auxiliary heater controller which utilizes a single electrical control valve to control the flow path of engine coolant heated by an auxiliary heater. This control valve may be easily activated to vary the flow path of heated fluid regardless of the operative or inoperative condition of the engine.

Another object of the present invention is to provide a novel and improved auxiliary heater controller which utilizes a single electrical control valve to control the flow path of the engine coolant heated by an auxiliary heater. This control valve may be operated to direct heated fluid in a path which completely bypasses the engine.

Yet another object of the present invention is to provide a novel and improved auxiliary heater controller which may be operated to pass coolant fluid from an engine through an auxiliary heater. The auxiliary heater controller may be activated regardless of the operating condition of the engine to provide heated fluid for the selective heating of either the engine or the vehicle cab. With the engine in the nonoperative condition, both the vehicle cab and the engine may be heated.

A further object of the present invention is to provide a novel and improved auxiliary heater controller which utilizes a single electrical control valve to control the flow path of engine coolant heated by an auxiliary heater. The heater controller coordinates the operation of a fan for a fluid to air heat exchanger so that the fan will not unnecessarily deplete the vehicle battery when the engine is not operating and heat is being provided to the vehicle cab. In this condition, the fan is operated in a slow speed condition and is cycled on and off by a thermostat controller.

A still further object of the present invention is to provide a novel and improved auxiliary heater controller utilizing a single electrical control valve to control the flow path of engine coolant heated by an auxilary heater. This auxiliary heater controller employs a single ganged control switch and separate timer switch to selectively achieve either the heating of the vehicle cab, manual preheating of the engine, timed preheating of the engine, timed preheating of the engine in combination with preheating of the vehicle cab, and automatic timed engine preheating. Additionally, the auxiliary heater controller provides either heating of the engine or heating of the cab with the engine in operation.

These and other objects of the present invention are accomplished by providing two closed flow paths for coolant from an engine. The first of these flow paths extends from the engine through a heat exchanger, a heater, and a solenoid bypass valve back to the engine. The second flow path bypasses the engine due to the positioning of the solenoid bypass valve which connects the output fluid flow from the heater directly back to the input of the heat exchange unit without permitting such fluid flow to pass through the engine. With the engine in a nonoperative condition, a single ganged switch controls the position of the solenoid valve to achieve either preheating of the engine, heating of a vehicle cab, or both. If the ganged switch is in the cab heating position, the heater circuit is energized, the solenoid valve is controlled so the engine is bypassed by heated fluid from the heater, and a fan for providing an air flow through the heat exchanger is cycled on and off by a thermostat at low speed. This cab heating operation may be combined with timed preheating of the engine by the activation by a second manually operated timer switch which causes fluid from the heater to pass through the engine as well as the heat exchanger for a predetermined time period. Finally, with the engine in an inoperative condition, movement of the ganged switch to an engine preheating position will cause the solenoid valve to direct heater fluid from the heater through the engine and back through the heat exchanger to the heater. However, in this condition, the fan for the heat exchanger is automatically deactivated so no heat passes to the vehicle cab.

When the engine is operating, the thermostat which controls the fan for the heat exchanger is deactivated, and the fan may be manually operated at various speeds to provide heat to the vehicle cab. The ganged switch is manually operated to selectively provide heat either to the vehicle cab or to the engine by varying the position of the single solenoid operated control valve.

BEST MODE FOR CARRYING OUT THE INVENTION

Figure 1:
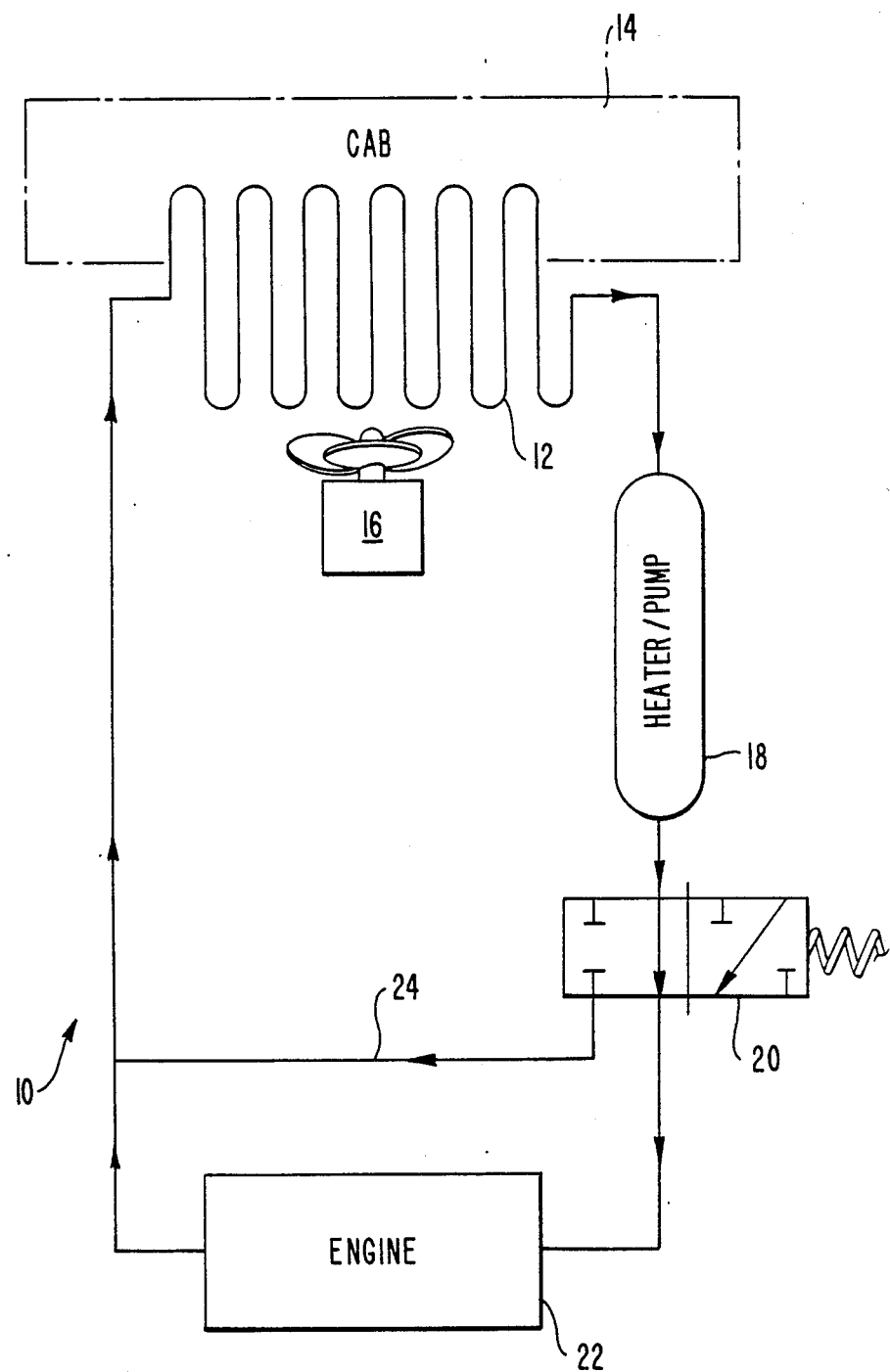
FIG. 1 is a schematic diagram showing the fluid heating paths for the auxiliary heater controller of the present invention.

Referring to FIG. 1, the basic fluid circuit for the auxiliary heater controller 10 of the present invention includes a heat exchanger 12 which is adapted to provide heat to the cab 14 of a truck or similar vehicle upon activation of a fan 16. The fan directs air across the heat exchanger and into the cab, and this air is heated by heat transfer from the fluid within the heat exchanger. The heat exchanger is connected to a combination heater and pump unit 18 which heats the fluid within the fluid circuit and also pumps the fluid through the circuit. The heater and pump unit may be formed in a single module, or may constitute separate units, but the two are electrically connected in such a manner that the pump is activated when the heater is electrically energized. The heater may be any type of known auxiliary heater which is electrically activated and which operates to heat fluid passing through the heater. Electrically activated heaters of this type which burn oil, diesel fuel, or other fuels are well known in the art, and any one of these heaters could be employed as the water heater in the combined heater and pump unit 18.

The output from the heater and pump unit 18 is provided to a conventional solenoid operated two-position valve 20. This two-position valve, in the deenergized or "off" state, connects the heater and pump unit 18 directly to an engine 22 as shown in FIG. 1. Thus, when the heater and pump unit is energized, fluid is pumped from the engine 22 through the heat exchanger 12 and the heater and pump unit 18 to the solenoid operated valve 20 and back to the engine 22. A portion of the normal engine cooling fluid is used to charge this auxiliary flow path.

When the solenoid operated two-position valve 20 is energized, the output of the heater and pump unit 18 is connected to a bypass line 24 which conducts fluid around, rather than through, the engine 22. Thus, fluid from the heater and pump unit 18 flows through the solenoid operated valve 20, the bypass line 24, and the heat exchanger 12 back to the heater and pump unit. The lines between the solenoid operated valve 20 and the engine 22 as well as between the engine 22 and the bypass line 24 will remain charged with fluid, so that substantially no fluid passes through the engine 22 when the solenoid operated valve 20 is energized. This is of substantial benefit when extremely cold temperatures prevail and it is desirable to heat the cab 14 without running the engine 22. Since it is not necessary for fluid in the system to pass through the cold engine 22, heated fluid from the heater and pump unit 18 may pass directly through the heat exchanger 12 and back to the heater and pump unit, thereby rapidly heating the heat exchanger 12 and the cab 14. This bypassing of the engine 22 also permits a much smaller heater to be used in the system than would be required if all fluid to be heated had to pass through the engine. The mass of an extremely cold engine would offset much of the heating capability of the auxiliary heater during initial stages of cab heating, thereby requiring a much larger heater unit if all heating fluid must pass through the engine.

Figure 2:
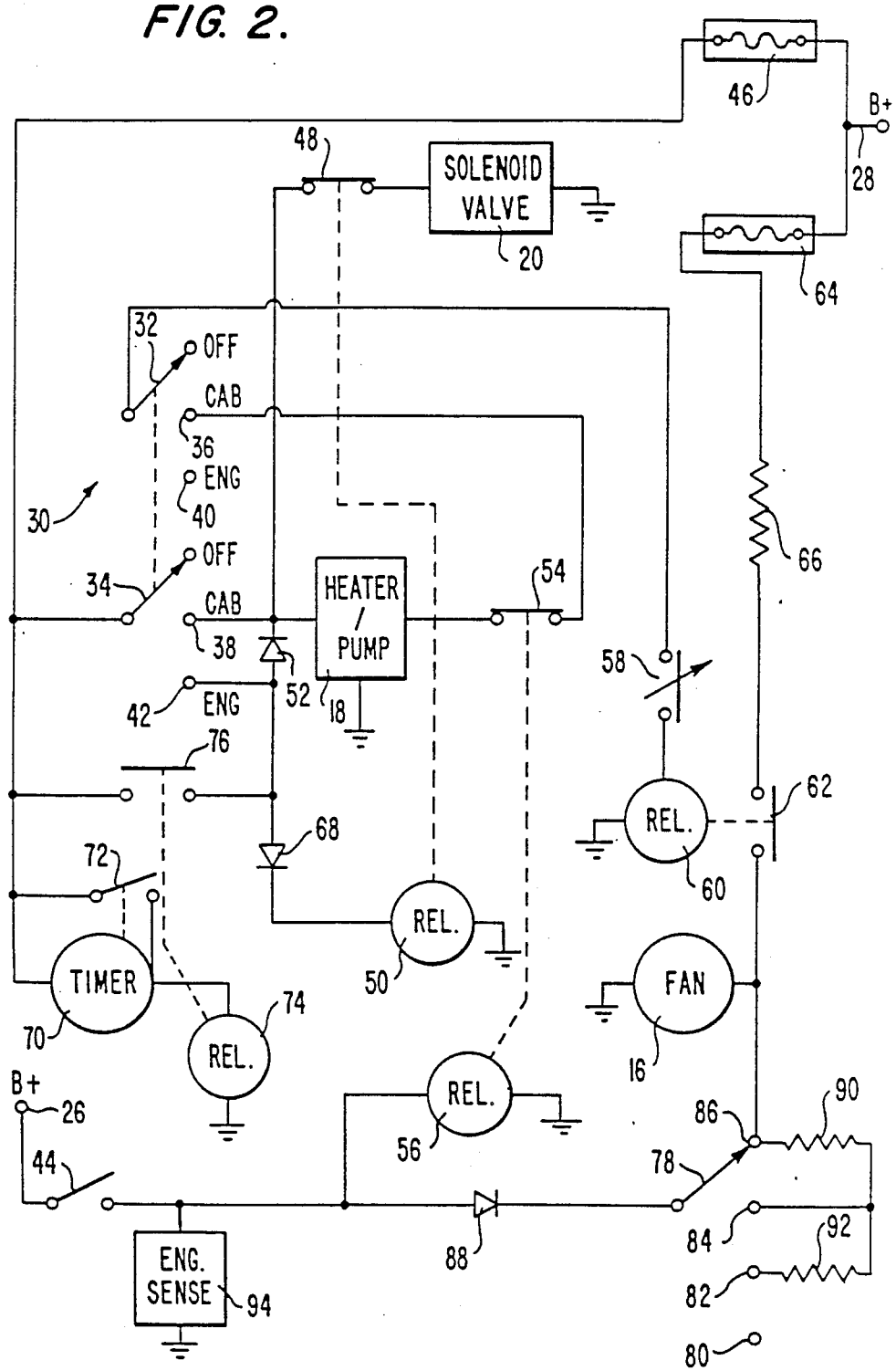
FIG. 2 is an electrical schematic diagram showing the electrical circuitry for the auxiliary heater controller of the present invention.

FIG. 2 illustrates the basic electrical control circuit for the auxiliary heater controller of the present invention. This circuit is powered from the vehicle battery and includes two positive power input terminals 26 and 28. Basic manual control of the auxiliary heater controller is achieved primarily by means of a single ganged three-position control switch 30 having two switch arms 32 and 34 which are mounted so as to be controlled from within the cab 14. These switch arms may be moved from an off position to contact electrical switch contacts 36 and 38 which are "cab" contacts or to contact switch contacts 40 and 42 which are "engine" contacts. Engine contact 40 is a "dead" contact and is not connected to any circuitry.

The positive power terminal 26 is connected to an ignition switch 44 for the engine 22, and when this ignition switch is open as shown in FIG. 2, the engine is not running. With the engine shut down, if it should become desirable to heat the cab 14, the ganged control switch 30 is moved so that the switch arms 32 and 34 complete a circuit to the contacts 36 and 38, respectively. This completes a circuit from the input terminal 28 through a fuse 46 and across the switch arm 34 to the contact 38. The contact 38 now provides power to the heater and pump unit 18 and also across a normally closed switching circuit 48 for a normally closed relay 50. Power from the contact 38 to the relay 50 is blocked by a diode 52.

The contact 38 also provides power to the heater and pump unit 18, and with this unit energenized, power also passes across a normally closed switching circuit 54 for a normally closed relay 56 to provide power to the "cab" contact 36. This power then passes across the switch arm 32 to a switching thermostat 58. The thermostat 58 may be one of a number of known variable thermostats which can be set to a desired temperature setting. When the ambient temperature sensed by the thermostat is above the desired temperature setting, the thermostat contacts are open as indicated in FIG. 2, but when the ambient temperature sensed by the thermostat is below the predetermined setting, the thermostat closes to complete a circuit to a normally open relay 60. The thermostat 58 will be mounted within the cab 14 to control the interior temperature of the cab.

When the thermostat 58 completes a circuit to the normally open relay 60, power from the terminal 36 is provided to the relay causing the closure of a normally open relay switching circuit 62. This completes a circuit from the positive input terminal 28 across a fuse 64 and a resistor 66 to the fan 16. The resistor 66 is a fan speed control resistor, and is of sufficient resistance to ensure that the fan operates at a low operating speed when power is provided across the normally open relay switching circuit 62. As was previously explained with reference to FIG. 1, energization of the solenoid operated valve 20 from the contact 38 across the normally closed switching circuit 48 causes fluid to bypass the engine 22 and move through the line 24 to the heat exchanger 12 and the heater and pump unit 18. Thus, the cab 14 is rapidly heated by fluid which is not subjected to cooling by the inoperative cold engine 22. The fan 16 can only be operated at a low speed due to the resistor 66, and this minimizes the drain on the vehicle battery which is not being charged by an operating engine. Also, the fan will be cycled off and on by the switching thermostat 58 to maintain the temperature of the cab 14 at the level preset on the thermostat as the thermostat opens and closes the circuit to the normally open relay 60. Therefore, with the engine 22 inoperative, the cab 14 will be maintained at a preset temperature by fluid heated in the heater and pump unit 18 and a minimum drain on the vehicle battery will occur.

If the engine 22 has been inoperative in cold ambient conditions for a prolonged period, it is possible to preheat the engine by operating the ganged three-position control switch 30 so that the switch arms 32 and 34 contact the "engine" contacts 40 and 42, respectively. Now power will be provided from the input terminal 28 across the fuse 46 and the switch arm 34 to the contact 42. Power from the contact 42 passes across a diode 68 to energize the normally closed relay 50, thereby opening the normally closed switching circuit 48. Thus, power from the contact 42 across the doide 52 will energize the heater and pump unit 18 but will not be permitted to energize the solenoid valve 20. The deenergized solenoid valve will assume the position of FIG. 1, and heated fluid from the heater and pump unit 18 will not pass through the engine 22 and the heat exchanger 12 back to the heater and pump unit 18.

It will be noted that when the switch arm 34 is positioned to complete a circuit to the contact 42, the switch arm 32 moves onto the "dead" contact 40. Thus, the circuit to the thermostat 58 remains open, and the normally open relay 60 prevents operation of the fan 16. Consequently, heated fluid will be provided from the heater and pump unit 18 directly to the engine 22, and heat will not be removed from this fluid during its passage through the heat exchanger 12 by the fan 16.

It is possible, with the engine 22 inoperative, to provide heated fluid from the auxiliary heater and pump unit 18 to the engine for a pretimed period while still providing heat to the cab 14. To accomplish this, the three-position control switch 30 is moved so that the switch arms 32 and 34 make contact with the "cab" contacts 36 and 38. As previously explained, this energizes the heater and pump unit 18, the thermostat 58, and the normally open relay 60 so that the fan 16 is caused to blow air over the heat exchanger 12 and into the cab 14. Normally, with the ganged three-position control switch in the "cab" position, the solenoid valve 20 is energized across the normally closed switching circuit 48 for the normally closed relay 50, and thus fluid passes through the bypass circuit 24 around the engine 22. However, a timer 70 can be activated with the three-position control switch in the "cab" position to close a timer switch 72 and complete a circuit to a normally open relay 74. When the relay 74 is energized, a normally open switching circuit 76 for the relay is closed thereby providing power from the input terminal 28 across the diode 68 to energize the normally closed relay 50. This opens the normally closed switching circuit 48 to deenergize the solenoid valve 20 and permit fluid to pass from the heater and pump unit 18 to the engine 22. Thus, the engine is being preheated with fluid while the fan 16 is cycled by the thermostat 58 to heat the cab 14.

The timer 70 is preset to a desired time, and once this time elapses, the timer opens the switch 72 to break the circuit to the normally open relay 74. This removes power from the normally closed relay 50 causing the solenoid valve to again be energized across the normally closed switching circuit 48, and now the cab 14 will continue to be heated under the control of the thermostat 58 when the timed preheating of the engine has been completed.

The timer 70 provides the auxiliary heater controller 10 of the present invention with a capability not found in previously known auxiliary heating systems for engines. It is possible to use conventional 24-hour or other long period timer units known to the art as the timer unit 70. Such long period timer units can be set to activate at any time during a 24-hour or longer period and to remain activated for a pre-timed duration. Thus, with the ganged three-position control switch 30 in the "off" position as shown in FIG. 2, the timer 70 can be preset to activate at any chosen time within the timer range. For a 24-hour timer, the timer might be set to activate at 10 p.m. for a 10-minute period. At 10 p.m., the switch 72 would be closed to complete a circuit from the positive input terminal 28 to the normally open relay 74 causing this relay to close the normally open switching circuit 76. Now power would be provided from the positive input terminal 28 across the switching circuit 76 and the diode 52 to activate the heater and pump unit 18 and also across the diode 68 to energize the normally closed relay 50. This would open the normally closed switching circuit 48 to deenergize the solenoid operated valve 20, and this would complete the fluid circuit from the heater and pump unit to the engine 22 as shown in FIG. 1. The circuit would remain complete to pump heated fluid from the heater and pump unit 18 to the engine 22 for the period controlled by the timer 70, after which the switch 72 would be reopened. Thus, the auxiliary heater controller of the present invention is capable of preheating a cold engine at any time in accordance with the time set on the timer 70.

When the engine 22 is running and the ignition switch 44 is closed, the cab 14 may be heated by moving the ganged three-position control switch 30 to the "cab" position. This causes the heater and pump unit 18 to be energized across the switch arm 34, and at the same time, power is provided from the positive power input 26 across the ignition switch 44 to energize the normally closed relay 56. This opens the normally closed switching circuit 54 so that the thermostat 58 and the normally opened relay 60 are not energized. Now, the fan 16 may be manually controlled by moving a fan control switch 78 from an off contact 80 to speed control contacts 82, 84 or 86. In FIG. 2, the fan control switch 78 is shown in the high-speed condition where power from the positive power input 26 is provided through the ignition switch 44 and a diode 88 to the fan control switch 78. The fan control switch is shown in engagement with the high-speed switch contact 86, and with no resistance in the circuit, the fan 16 is driven at maximum speed. When the fan control switch is moved into engagement with contact 84, a resistor 90 is included in the fan circuit, and the speed of the fan 16 is thereby reduced. Movement of the fan control switch arm 78 to the contact 82 places resistors 90 and 92 in the fan circuit, and at this point, the fan 16 will be driven at its lowest speed. This is the same low speed controlled by the resistor 66 which is equal in resistance to the combined series resistances of the resistors 90 and 92. The diode 88 prevents power from the positive input terminal 28 from reaching the normally closed relay 56 when the normally open relay switching circuit 62 is closed to energize the fan 16 in the event that the fan control switch 78 is left in engagement with one of the contacts 82, 84 or 86.

Obviously, there is no need to limit the speed of the fan 16 with the engine 22 operating, since the vehicle battery is being recharged by the engine and cannot be depleted. Thus, although the heater and pump unit 18 is energized across the switch arm 34 as well as the solenoid valve across the normally closed switching circuit 48, the normally closed switching circuit 54 is maintained open to deactivate the thermostat 58 and the normally open relay 60.

Also, during the operation of the engine 22, the vehicle operator can apply supplemental heating to the engine by moving the ganged three-position control switch 30 to the "engine" position. This results in operation of the auxiliary heater controller in the manner previously described to provide power from the positive power input terminal 28 across the switch arm 34 and contact 42 to the heater and pump unit 18 as well as to the normally closed relay 50. The resultant deenergization of the solenoid operated valve 20 causes heated fluid from the heater and pump unit 18 to pass through the engine 22 and the heat exchanger 12. Obviously, since the ignition switch 44 is closed, the fan control switch 78 can be positioned to operate the fan 16 to simultaneously provide heat to the cab as well as to the engine.

Figure 3:
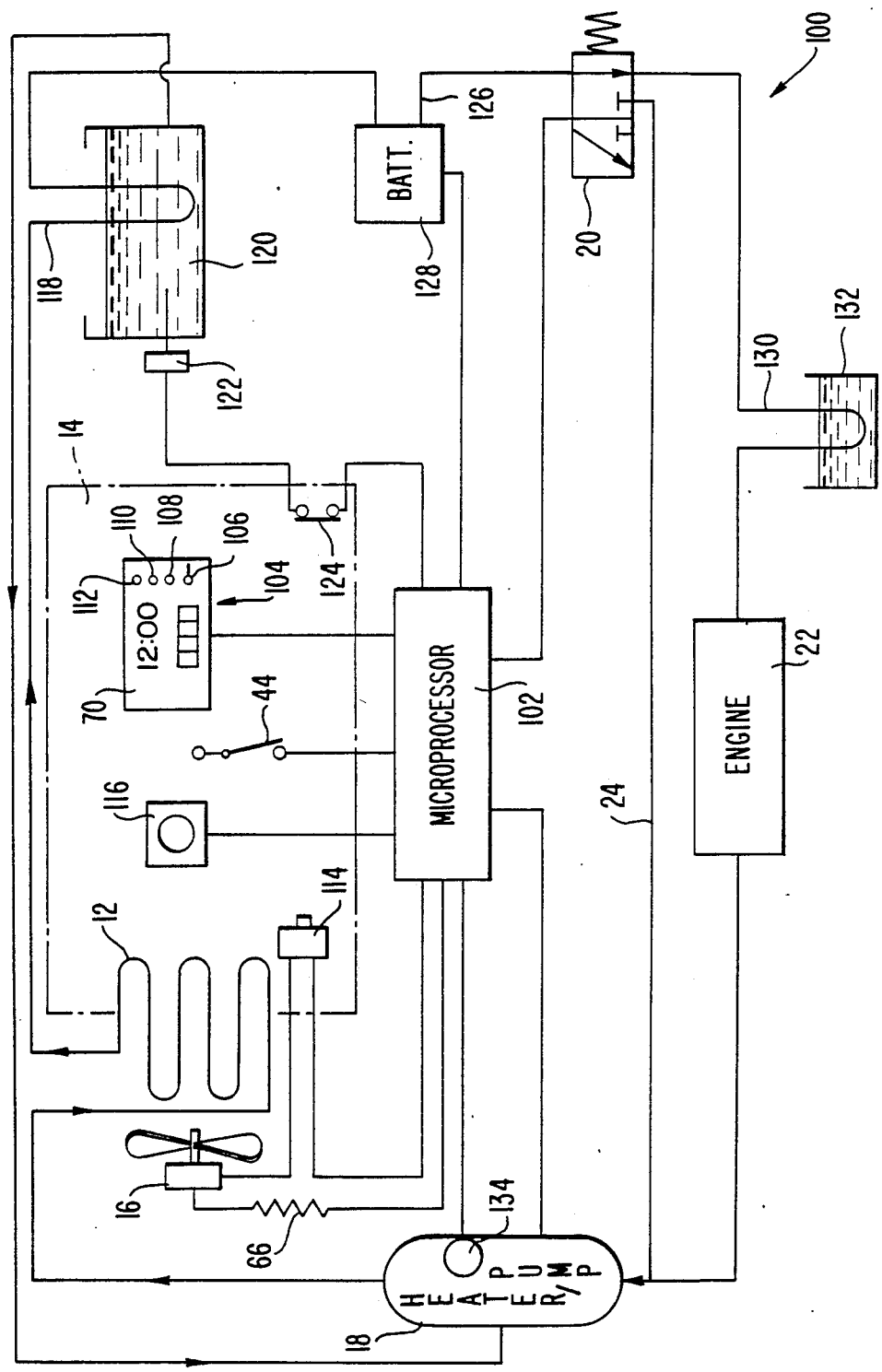
FIG. 3 is a schematic electrical and fluid diagram showing a second embodiment of the auxiliary heater controller of the present invention.

Referring now to FIG. 3, a second embodiment of the auxiliary heater controller of the present invention is indicated generally at 100. In FIG. 3, elements of the auxiliary heater controller which are identical to those previously described in connection with FIGS. 1 and 2 and which operate in the same manner are designated by like reference numerals. The auxiliary heater controller 100 operates under the control of a central microprocessor 102 and thereby eliminates the various relay controllers previously described in connection with the auxiliary heater controller 10 of FIG. 2. The program for this microprocessor is disclosed in the appendix attached hereto, but the operation of this microprocessor under the control of the program will be readily understood from the following description.

The auxiliary heater controller 100 is operated by the microprocessor 102 in response to a mode selection switch 104 mounted upon the panel for the timer 70 within the cab 14. This mode selection switch operates in a manner similar to the ganged control switch 30 of FIG. 2, and includes an "off" position 106, a "cab" position 108, an "engine" position 110, and a "both" position 112 wherein both the cab and the engine are heated. When the mode selection switch is moved to the "cab" position 106, the microprocessor 102 operates in response to this switch position to activate the heater and pump unit 18 to begin heating and circulating fluid. Simultaneously, the microprocessor causes the solenoid operated valve 20 to become energized and bypass the engine 22 by means of the bypass line 24. If the microprocessor senses that the ignition switch 44 is open so that the engine 22 is not running, the microprocessor will bypass a fan speed control switching unit 114 which is mounted within the cab 14 and will instead energize the fan 16 across the speed limiting resistor 66 so that the fan will operate only on low speed. The fan speed control switching unit 114 operates in the same manner as the fan control switch 78 and resistors 90 and 92 of FIG. 2 to manually vary the speed of the fan 16. Thus, when the ignition switch 44 is open and the engine 22 is not running, the fan 16 will be operated on low speed to heat the cab 14 and minimize drain on the vehicle battery. However, when the microprocessor 102 senses that the ignition switch 44 is closed so that the engine 22 is running, the fan will be energized by the microprocessor through the manually operable fan speed selection switch 114. A conventional thermostat 116 senses the temperature within the cab 14 and signals the microprocessor to either initiate or discontinue cab heating. The microprocessor will cycle the cab heating system on and off under the control of the thermostat 116 to maintain the cab 14 at a desired temperature.

It will be noted that the fluid loop for the auxiliary heater controller 100 contains a number of auxiliary units which can be selectively added to the fluid circuit. A first of these auxiliary units, which can prove to be extremely important when the auxiliary heater controller and the engine 22 are to be operated in extremely frigid temperatures, is a fuel heat exchanger 118 which extends into the fuel tank 120 for the engine 22. This fuel heat exchanger is a fluid to fluid heat exchanger which operates to provide heat to the fuel in the fuel tank whenever the heater and pump unit 18 is energized. When the engine 22 is a diesel engine, both the engine and the auxiliary heater in the heater and pump unit 18 may receive fuel from the fuel tank 120. By using diesel fuel to fire the auxiliary heater, it is then not necessary to provide a separate source of heater fuel. In extremely cold temperatures, however, diesel fuel tends to gel, and when this occurs, it can prove impossible to either start the engine 22 or to fire the auxiliary heater for the heater and pump unit 18. Thus, if the fuel in the fuel tank 120 is permitted to gel in the presence of extreme cold, the function and purpose of the auxiliary heater controller could be defeated. To prevent this, a fuel temperature sensing unit 122 senses the temperature of the fuel within the fuel tank 120, and when this temperature drops below a predetermined range, a signal is provided to the microprocessor from the fuel temperature sensing unit. This signal causes the microprocessor 102 to activate the heater and pump unit 18 and to cause the solenoid operated valve 20 to be energized and provide fluid through the bypass line 24. The microprocessor will avoid energization of the fan 16 when operating in response to a signal from the fuel temperature sensing unit 122 to insure that cold air is not blown into the cab 14. Once the fuel in the fuel tank 120 reaches a desired temperature, the microprocessor 102 operates in response to the fuel temperature sensing unit 122 to deenergize the solenoid operated valve 20 as well as the heater and pump unit 18. In this manner, the fuel in the fuel tank 120 is always maintained at a temperature sufficient to insure effective operation of the heater and pump unit 18 as well as the engine 22 regardless of the position of the mode selection switch 104.

It is obvious that it may not be desirable to activate the fuel heat exchanger 118 when the unit is incorporated in a vehicle which remains inactive for a prolonged period. Thus, a manually operated switch 124 is mounted within the cab 14 and may be opened to disconnect the fuel temperature sensing unit 122 from the microprocessor 102. This insures that when the vehicle is inactive for long periods of time that the fuel heating system will not be activated. It is, of course, apparent that this fuel heating system need not be limited for use only when both the auxiliary heater and engine receive fuel from the same fuel tank, but this system can be used in fuel tanks which provide fuel to only one of these units.

A second auxiliary unit which may be added to the fluid circuit for the auxiliary heater controller 100 is a battery heating unit 126 for a vehicle battery 128. This battery heating unit may take the form of a fluid heating loop which surrounds the battery or fluid supply pipes which supply heated fluid to a fluid jacket surrounding the battery. Like the fuel heat exchanger 118, the battery heating unit 126 operates whenever the heater and pump unit 18 is activated.

A third auxiliary unit which may be included in the fluid loop which services the engine 22 is an oil heat exchanger 130 for heating the engine oil in an oil supply unit 132. The oil supply unit may be any oil containing portion of the engine oil system, and the oil heat exchanger 130 heats this oil whenever the heater and pump unit 18 is activated with the solenoid operated control valve 20 in the deenergized or engine heating position.

When the mode selection switch 140 is moved to the "engine" position 110, the microprocessor 102 activates the heater and pump unit 18 but does not activate the solenoid operated valve 20, or the fan 16. Thus, heated fluid will now circulate through the cab heat exchanger 12, but the cab 14 will not be heated due to the inactive fan 16. Heated fluid will also circulate through the engine 22 and any auxiliary heating units which are supplied such as the fuel heat exchanger 118, the battery heater 126, and the oil heat exchanger 130.

When the mode selection switch 104 is moved to the "both" position 112, the microprocessor 102 will cause both the cab 14 and the engine 22 to receive heat. Thus, the microprocessor will energize the heater and pump unit 18, but not the solenoid operated valve 20. The microprocessor will also activate the fan 16 if the thermostat 116 indicates that cab heat is required. Obviously, the speed of the fan 16 will be controlled by either the resistor 66 or the fan speed selection switch 114 depending upon whether or not the ignition switch 44 is in the open or closed position. It is conceivable that when the engine 22 is not running and the mode selection switch 104 is in the "both" position 112, the engine could initially cool the fluid in the system to such an extent that it would not be desirable to blow air into the cab 14. Thus, a thermistor or other similar fluid temperature measuring unit 134 is included in the heater and pump unit 18 to measure the temperature of the output fluid therefrom circulated by the pump, and this fluid temperature measuring unit is connected to the microprocessor 102. When the output fluid temperature is below a predetermined level, the temperature sensing unit 134 will provide a low temperature sensing signal to the microprocessor 102, and the microprocessor will not activate the fan 16 in response to the thermostat 116 so long as this low temperature condition prevails. This prevents the fan from being activated and blowing cold air into the cab 14 before the heater and pump unit 18 can sufficiently heat the fluid in the system. As the system begins to heat up, the temperature sensing unit 134 will provide an indication to the microprocessor 102 which will cause the microprocessor to activate the fan 16 and the solenoid control valve 20 so that only cab heating by means of the bypass line 24 initially occurs. However, with the mode selection switch in the "both" position, once the fluid temperature sensing unit 134 senses that the fluid temperature has been raised to a point sufficient to heat both the cab and the engine, a signal is provided to the microprocessor causing it to deactivate the solenoid operated valve 20 and provide fluid to both the engine 22 and the heat exchanger coil 12. Should the fluid temperature in the system again begin to drop, the fluid temperature sensing unit 134 will first signal the microprocessor to reactivate the solenoid operated valve 20, so that only the cab is heated, but if the temperature still falls below the minimum level, the fluid sensing unit 134 causes the microprocessor to shut down the fan 16 until the system fluid temperature again rises to an acceptable level.

The timer 70 controls the microprocessor 102 to initiate a timed engine preheat function. For example, with a 72-hour timer, an operator could schedule an engine preheat cycle so that this cycle will automatically begin up to 72-hours later. Thus, in a vehicle which has been sitting idle over a week-end, the engine preheat cycle could be scheduled to begin on a Monday morning up to three hours before the vehicle is scheduled for use. To accomplish this, the timer 70 is preset to send a preheat signal to the microprocessor 102 at the scheduled time. This causes the microprocessor to activate the heater and pump unit 18 so that heated fluid will be pumped through the engine 22 in the manner previously described. If a timed engine preheat cycle is initiated with the mode selection switch 104 in the "cab" position 108, the cab heating function will take priority over the engine heating function due to he previously described operation of the fluid temperature sensor 134. In this situation, upon receipt of the engine preheat signal from the timer 70, the microprocessor 102 will initially deenergize the solenoid operated valve 20 to divert fluid away from the bypass line 24 and to direct fluid through the engine 22. This operation may begin to introduce cold coolant from the engine into the rest of the fluid circuit, and if the fluid sensing unit 134 senses that fluid temperature has decreased below the first acceptable fluid level, the fluid sensor will cause the microprocessor to shift the solenoid operated valve 20 back into the bypass position to divert fluid around the engine 22. This condition will be maintained until the coolant temperature reaches a level at which both the cab 14 and engine 22 may be effectively heated, at which time, the fluid temperature sensor 134 provides a signal to cause the microprocessor 102 to again deactivate the solenoid operated valve 20.

The timer 70 generally permits the scheduled engine preheating function to occur for a set period of time, such as for example, three hours, and then the timer will terminate the preheating function automatically. Although the fluid temperature sensing unit 134 can be set to operate at a number of various temperatures, a satisfactory range of operation would be for this fluid temperature sensor to cause the microprocessor 102 to shift the system to the cab heating mode of operation when coolant temperature decreases to 57° C. Should this decrease continue to 55° C. or less, the microprocessor is caused to terminate operation of the fan 16.

Industrial Applicability

The auxiliary heater controller 100 of the present invention employs a single solenoid operated control valve to effectively provide multiple auxiliary heater functions for a vehicle or similar unit which incorporates a fluid cooled engine. This valve, when deenergized, permits fluid to flow in the normal fluid cycle through the engine, and when energized, permits fluid to flow in a bypass path around the engine. The device effectively controls an auxiliary fluid heater and pump unit 18 so that a single auxiliary heater operates effectively to preheat the vehicle engine and/or to provide heat to the vehicle cab or driver compartment. The auxiliary heater controller operates effectively with the engine shut down to provide cab heat, manual engine preheat, timed engine preheat, and timed engine preheat combined with cab heat. Also, the system operates effectively to provide automatic timed engine preheat for a controlled period of time at a preselected period during the day. In all instances where the engine is in a nonoperating mode, the fan for providing heat to the vehicle cab is controlled by a thermostat in a low-speed condition to minimize battery drain. The system operates effectively with the engine running to provide heat to either or both the cab and the engine, and in this condition the degree of heat in the cab may be manually controlled by varying fan speed.

I claim:

1. An auxiliary heater controller for use with a liquid cooled engine comprising a first fluid circuit including said engine, a heat exchanger means, an electrically operated heater means and an electrically operated pump means, said first fluid circuit extending from said engine through a series combination including said heater means, pump means and heat exchanger means back to said engine, two-way valve means directly connected to said engine to receive fluid which has passed through said heat exchanger means, said heater means, and said pump means, said two-way valve means being formed by a single electrically operated solenoid valve, and a fluid bypass line extending from said two-way valve means around said engine to form a second fluid circuit, said second fluid circuit including said heat exchanger means, heater means and pump means, the two-way valve means being operative to direct fluid to flow in either said first or said second fluid circuit, and control circuit means connected to a power source for selectively providing power to said pump means, heater means and two-way valve means, said control circuit means including timer means connected to selectively open or close a power circuit between said power source, said heater means and said pump means and, upon closing said power circuit, to cause said two-way valve means to permit fluid flow in said second fluid circuit, said timer means having the capability of being preset to close said power circuit at a first time and to open said power circuit at a second time subsequent to said first time to cause said two-way valve means to switch fluid flow to said first fluid circuit.

2. An auxiliary heater controller for use with a liquid cooled engine comprising a first fluid circuit including said engine, a heat exchanger means, an electrically operated heater means and an electrically operated pump means, said first fluid circuit extending from said engine through a series combination including said heater means, pump means and heat exchanger means back to said engine, two-way valve means directly connected to said engine to receive fluid which has passed through said heat exchanger means, said heater means, and said pump means, said two-way valve means being formed by a single electrically operated solenoid valve, and a fluid bypass line extending from said two-way valve means around said engine to form a second fluid circuit, said second fluid circuit including said heat exchanger means, heater means and pump means, the two-way valve means being operative to direct fluid to flow in either said first or said second fluid circuit, and control circuit means connected to a power source for selectively providing power to said pump means, heater means and two-way valve means, said control circuit means including timer means connected to selectively open or close a power circuit between said power source, said heater means and said pump means and, upon closing said power circuit, to cause said two-way valve means to permit fluid flow in said second fluid circuit, said timer means having the capability of being preset to close said power circuit at a first time and to open said power circuit at a second time subsequent to said first time, said two-way valve means operating upon receipt of electrical power to direct fluid to flow in said second fluid circuit and in the absence of electrical power to direct fluid to flow in said first fluid circuit, said timer means being connected to selectively open or close a power circuit between said power source and said two-way valve means to provide power to said two-way valve means when power is provided to said pump means and heater means.

3. An auxiliary heater controller for use with a liquid cooled engine comprising a first fluid circuit including said engine, a heat exchanger means including electrical fan means for directing heated air from said heat exchanger means, an electrically operated heater means and an electrically operated pump means, said first fluid circuit extending from said engine through a series combination including said heater means, pump means and heat exchanger means back to said engine, electrically operated two-way valve means directly connected to said engine to receive fluid which has passed through said heat exchanger means, said heater means, and said pump means, and a fluid bypass line extending from said two-way valve means around said engine to form a second fluid circuit, said second fluid circuit including said heat exchanger means, heater means and pump means, the two-way valve means being operative to direct fluid to flow in either said first or said second fluid circuit, and control circuit means connected to a power source for selectively providing power to said pump means, heater means and two-way valve means, said control circuit means having power input means connected to said power source, control switch means manually operable between an "off" position, a cab contact position, and an engine contact position, said heater means and pump means being connected to receive power from said control switch means when said control switch means is in the cab contact position, said two-way valve means being normally operable with said control switch means in the cab contact position to direct fluid flow through said second fluid circuit.

4. The auxiliary heater controller of claim 3 wherein said control circuit means includes fan circuit means connected to said power input means to selectively provide power to said fan means, said fan circuit means including thermostat control means which may be preset to a specified temperature, said thermostat control means operating upon receipt of power from said power input means to sense ambient temperature and cause power to be provided to said fan means when the sensed ambient temperature is below said preset specified temperature.

5. The auxiliary heater controller of claim 4 wherein said fan circuit means includes resistor means connected between said fan means and said power input means which is operative to maintain said fan means at a reduced low speed of operation when said thermostat control means operates to cause power to be provided to said fan means.

6. The auxiliary heater controller of claim 5 wherein said thermostat control means is not operative to cause power to be provided to said fan means by said fan circuit means when power to said thermostat control means from said power input means is terminated, said control switch means being operable in the cab contact position to cause said fan circuit means to provide power to said thermostat control means.

7. The auxiliary heater controller of claim 6 wherein said control circuit means includes engine condition circuit means operative when said engine is operative to prevent power from reaching said thermostat control means, said fan circuit means including a normally closed electrically operated switch means connected between said control switch means and said thermostat control means, said engine condition circuit means operating to open said normally closed electrically operated switch means when said engine is operating.

8. The auxiliary heater controller of claim 7 which includes manually operable fan speed control means connected to said fan means, said manually operable fan speed control means being variable to change the speed of said fan means, said engine condition circuit means operating to provide power for said fan means to said manually operable fan control means when said engine is operating and to terminate the power to said manually operable fan control means when said engine is not operating.

9. The auxiliary heater controller of claim 8 wherein said control switch means connects said power input means to said thermostat control means across said normally closed electrically operated switch means when said control switch means is in the cab position.

10. The auxiliary heater controller of claim 9 wherein said two-way valve means includes a single electrically operated solenoid valve, said two-way valve means operating upon receipt of electrical power to direct fluid to flow in said second fluid circuit and in the absence of electrical power to direct fluid to flow in said first fluid circuit.

11. The auxiliary heater controller of claim 10 wherein a second normally closed electrically operated switch means is connected between said two-way valve means and said control switch means when said control switch means is in the cab contact position.

12. The auxiliary heater controller of claim 11 wherein said heater means and pump means are connected to receive power from said control switch means when said control switch means is in the engine contact position, said control switch means operating in the engine contact position to provide power to said second normally closed electrically operated switch means, said second normally closed electrically operated switch means operating upon receipt of power to open and prevent power from reaching said two-way valve means.

13. The auxiliary heater controller of claim 12 wherein said control circuit means includes timer means selectively operative with said control switch means in the cab control position to provide power for a preset time period to said second normally closed electrically operable switch means.

14. An auxiliary heater controller for use with a liquid cooled engine comprising a first fluid circuit including said engine, a heat exchanger means including electrical fan means for directing heated air from said heat exchanger means, a heater means and a pump means, said first fluid circuit extending from said engine through a series combination including said heater means, pump means and heat exchanger means back to said engine, two-way valve means directly connected to said engine to receive fluid which has passed through said heat exchanger means, said heater means, and said pump means, and a fluid bypass line extending from said two-way valve means around said engine to form a second fluid circuit, said second fluid circuit including said heat exchanger means, heater means and pump means, the two-way valve means being operative to direct fluid to flow in either said first or said second fluid circuit, and control circuit means connected to a power source for selectively providing power to said pump means, heater means, two-way valve means and fan means, said control circuit means including a first fan power circuit means for providing power to said fan means when said engine is inoperative to cause said fan means to operate in a first mode, and a second fan power circuit means for providing power to said fan when said engine is operating to cause said fan means to operate in a second mode which is different from said first mode.

15. The auxiliary heater controller of claim 14 wherein said first fan power circuit means includes thermostat control means which may be preset to a specified temperature, said thermostat control means operating when said first fan power circuit means is operative to sense ambient temperature and cause power to be provided to said fan means only when the sensed ambient temperature is below said preset specified temperature.

16. The auxiliary heater controller of claim 15 wherein said first fan power circuit means is operative to maintain said fan means at a reduced low speed of operation when said thermostat control means operates to cause power to be provided to said fan means.

17. The auxiliary heater controller of claim 15 wherein said control circuit means includes engine condition circuit means operative when said engine is operative to activate said second fan power circuit means and deactivate said first fan power circuit means.

18. The auxiliary heater controller of claim 17 wherein said second fan power circuit means includes manually operable fan speed control means connected to said fan means and being manually operable to vary the speed of said fan means when said second fan power circuit is activated.

19. An auxiliary heater controller for use with a liquid cooled engine comprising a first fluid circuit including said engine, a heat exchanger means, a heater means and a pump means, said first fluid circuit extending from said engine through a series combination including said heater means, pump means and heat exchanger means back to said engine, electrically operated valve means directly connected to said engine to receive fluid which has passed through said heat exchanger means, said heater means, and said pump means, a fluid bypass line extending from said valve means around said engine to form a second fluid circpit, said second fluid circuit including said heat exchanger means, heater means and pump means, and controller means operative to control said heater means, pump means and valve means, said valve means being operative by said controller means to direct fluid to flow in either said first or said second fluid circuit, said controller means being operative in a selected one of a plurality of operational modes and operating in a first operational mode to cause the operation of said heater means and pump means and to cause said an electrical activating signal to be provided to said valve means, said valve means operating upon receipt of the electrical activating signal to direct fluid to flow in said second fluid circuit and in the absence of said electrical activating signal to direct fluid to flow in said first fluid circuit, said controller means operating in a second operational mode to provide no electrical activating signal to said valve means and to cause the operation of said heater and pump means.

20. The auxiliary heater controller of claim 19 which includes timer means connected to said controller means, said timer means operable upon the expiration of a preset time to cause said controller means to initiate operation of said heater means and pump means.

21. The auxiliary heater controller of claim 19 which includes an auxiliary fluid heating unit for heating a fluid contained within a supply vessel by using fluid in said second fluid circuit which has passed through said heater means, said auxiliary fluid heating unit including a fluid to fluid heat exchanger means mounted to extend into contact with fluid contained within said supply vessel, said fluid to fluid heat exchanger means being connected in said second fluid circuit to receive fluid which has been heated by said heater means, and fluid temperature sensing means mounted to sense the temperature of the fluid within said supply vessel, said fluid temperature sensing means being operable when the temperature of the fluid within said supply vessel drops below a predetermined temperature level to provide a control signal to said controller means to cause said controller means to activate said heater means and pump means.

22. The auxiliary heater controller of claim 19 which includes an oil heating unit for heating oil within said liquid cooled engine, said oil heating unit including a fluid heat exchanger means mounted to extend into contact with the oil within said engine, said fluid heat exchanger means being connected in said first fluid circuit to receive fluid which has been heated by said heater means.

23. The auxiliary heater controller of claim 19 which includes a battery heating unit for heating an electrical battery, said battery heating unit including fluid conducting means to conduct fluid around the exterior of an electrical battery, said fluid conducting means being connected in said second fluid circuit to receive fluid which has been heated by said heater means.

24. An auxiliary heater controller for use with a liquid cooled engine comprising a first fluid circuit including said engine, a heat exchanger means, a heater means and a pump means, said first fluid circuit extending from said engine through a series combination including said heater means, pump means and heat exchanger means back to said engine, valve means directly connected to said engine to receive fluid which has passed through said heat exchanger means, said heater means, and said pump means, a fluid bypass line extending from said valve means around said engine to form a second fluid circuit, said second fluid circuit including said heat exchanger means, heater means and pump means, and controller means operative to control said heater means, pump means and valve means, said valve means being operative by said controller means to direct fluid to flow in either said first or said second fluid circuit, and said heat exchanger means includes electrical fan means for directing heated air from said heat exchanger means, said controller means operating to selectively cause power to be provided to said pump means, heater means, valve means and fan means.

25. The auxiliary heater controller of claim 24 wherein a temperature sensing means is mounted to sense the temperature of fluid heated by said heater means, said temperature sensing means being connected to said controller means and operative when said sensed fluid temperature drops below a first temperature level to cause said controller means to prevent power from being provided to said fan means.

26. The auxiliary heater controller of claim 24 wherein fan power circuit means are connected between said controller means and said fan means, said fan power circuit means including manually operable fan speed control means which may be manually operated to vary the speed of said fan means, said controller means including means to sense when said engine is operating or is inoperative, the controller means operating when said engine is inoperative to prevent operation of said fan speed control means and to cause said fan means to operate at a single low speed.

27. The auxiliary heater controller of claim 26 wherein temperature sensing thermostat means are provided which may be set to a preset temperature setting, said thermostat means being connected to said controller means and being operative when the temperature sensed thereby is below the preset temperature setting to cause said controller means to provide power to said fan means.

28. The auxiliary heater controller of claim 19 wherein temperature sensing means is mounted to sense the temperature of fluid heated by said heater means, said temperature sensing means being connected to said controller mean and operative when said sensed fluid temperature drops below a first temperature level to provide a first low temperature signal to said controller means, said controller means operating in said second operational mode upon receipt of said first low temperature signal to switch to said first operational mode until the sensed fluid temperature rises above said first temperature level.

29. The auxiliary heater controller of claim 19 wherein said heat exchanger means includes electrical fan means for directing heated air from said heat exchanger means, said controller means operating to selectively cause power to be provided to said fan means, and temperature sensing thermostat means are connected to said controller means, said thermostat means being capable of being set to a preset temperature setting and being operative when the temperature sensed thereby is below said preset temperature to provide a low temperature signal to said controller means, said controller means operating in said first operational mode upon receipt of said low temperature signal to cause power to be provided to said fan means.

30. The auxiliary heater controller of claim 29 wherein said controller means operates in a third operational mode to cause operation of said heater means and pump means and to cause said valve means to direct fluid flow in said first fluid circuit, said controller means operating in said third operational mode upon receipt of said low temperature signal to cause power to be provided to said fan means.

31. The auxiliary heater controller of claim 29 wherein temperature sensing means is mounted to sense the temperature of fluid heated by said heater means, said temperature sensing means being connected to said controller means and operative when said sensed fluid temperature drops below a first temperature level to provide a first low fluid temperature signal to said controller means and when said sensed fluid temperature drops below a second temperature level lower than said first temperature level to provide a second low fluid temperature signal to said controller means, said controller means operating in said second operational mode upon receipt of said first low fluid temperature signal to switch to said first operational mode and in said first operational mode upon receipt of said second low fluid temperature signal to prevent power from being provided to said fan means.

32. An auxiliary heater controller for use with a liquid cooled engine comprising a first fluid circuit including said engine, a heat exchanger means, a heater means and a pump means, said first fluid circuit extending from said engine through a series combination including said heater means, pump means and heat exchanger means back to said engine, valve means directly connected to said engine to receive fluid which has passed through said heat exchanger means, said heater means, and said pump means, a fluid bypass line extending from said valve means around said engine to form a second fluid circuit, said second fluid circuit including said heat exchanger means, heater means and pump means, and controller means operative to control said heater means, pump means and valve means, said valve means being operative by said controller means to direct fluid to flow in either said first or said second fluid circuit, and an auxiliary fluid heating means for heating a fluid contained within a supply vessel by using fluid in said second fluid circuit which has passed through said heater means, said auxiliary fluid heating means including a fluid to fluid heat exchanger means mounted to extend into contact with fluid contained within said supply vessel, said fluid to fluid heat exchanger means being connected in said second fluid circuit to receive fluid which has been heated by said heater means, and fluid temperature sensing means mounted to sense the temperature of the fluid within said supply vessel, said fluid temperature sensing means being operable when the temperature of the fluid within said supply vessel drops below a predetermined temperature level to provide a control signal to said controller means to cause said controller means to activate said heater means and pump means.

* * * * *